H. D. SCHROEDER.
VALVE.
APPLICATION FILED JUNE 16, 1913.
1,112,564.
Patented Oct. 6, 1914.
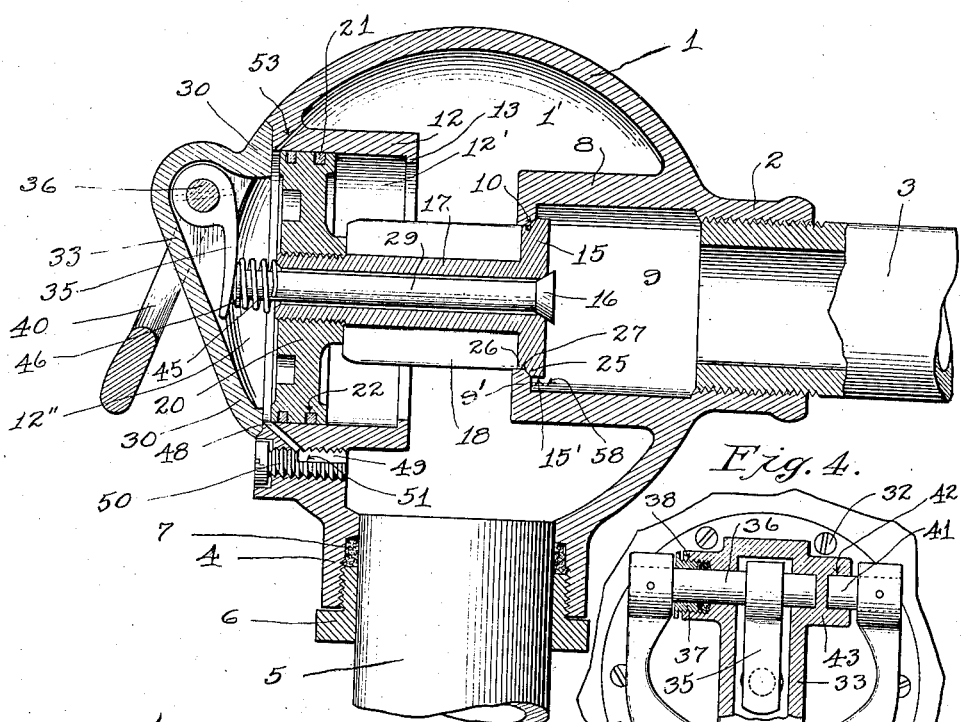
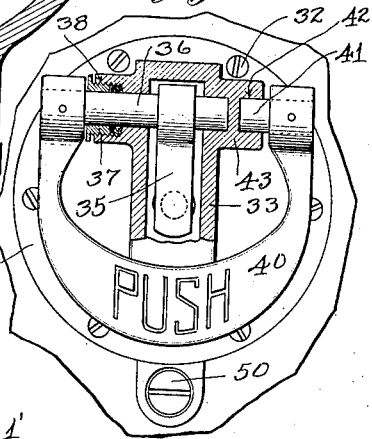
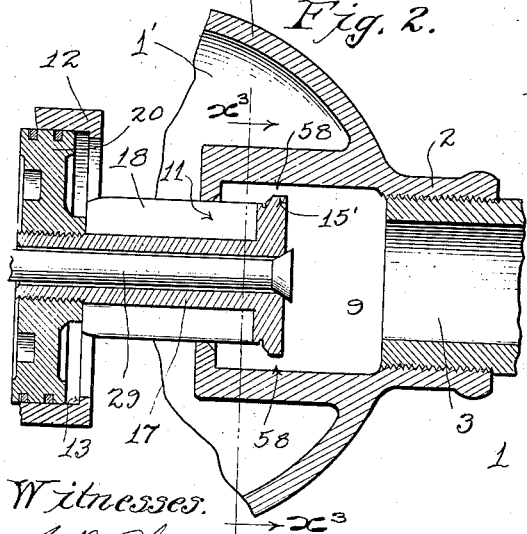
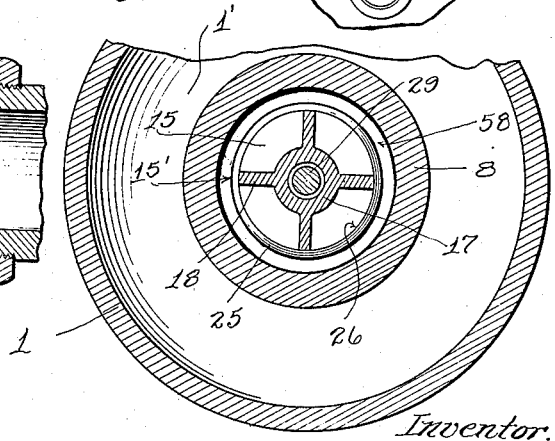
Witnesses.
Inventor.
Herman D. Schroeder.

UNITED STATES PATENT OFFICE.

HERMAN D. SCHROEDER, OF LOS ANGELES, CALIFORNIA.

VALVE.

1,112,564.  Specification of Letters Patent.  Patented Oct. 6, 1914.

Application filed June 16, 1913. Serial No. 773,903.

*To all whom it may concern:*

Be it known that I, HERMAN D. SCHROEDER, a citizen of the United States, residing at Los Angeles, in the county of Los Angeles and State of California, have invented a new and useful Valve, of which the following is a specification.

This invention relates to a valve which is adapted and intended for discharging from a supply pipe a definite quantity of water by a sudden or quick discharge lasting for a short period of time. Such valve is particularly adapted for use as a flushing valve in toilet bowls, but it may also be used as a supply valve for wash bowls, or for other purposes.

The main object of the present invention is to so construct the valve that it will be positive and certain in its operation under all conditions of pressure, and will not be subject to sticking or clogging even after extended use.

Another object of the invention is to provide a valve of this character in which the discharge will be smooth and free from objectionable noise.

Other objects of the invention will appear hereinafter.

The accompanying drawings illustrate an embodiment of the invention, and referring thereto: Figure 1 is a vertical section of the valve in normal closed position. Fig. 2 is a partial section showing the open position of the valve. Fig. 3 is a section on line $x^3$—$x^3$ in Fig. 2. Fig. 4 is a front elevation of a portion of the valve partly broken away to show the operating means.

The valve comprises a casing 1 formed preferably as a spherical shell, having at one side a screw threaded boss 2 into which screws an inlet pipe 3 for supplying water, and having at another portion of the casing, for example, at the bottom thereof, a screw threaded boss 4 to receive a discharge pipe 5 which is connected to the casing 1 by a stuffing box connection comprising a gland 6 screwing into the boss 4 and compressing a packing 7. Casing 1 is formed with an inwardly projecting cylindrical wall 8 forming an inlet chamber 9 which is in line with and communicates with the supply pipe 3, and said wall 8 is provided at its inner end with an inturned flange 9' formed with an inclined or conical valve seat 10, and with a cylindrical port opening 11. Opposite the inlet chamber 9 aforesaid, the casing 1 is provided with an inwardly extending cylindrical wall 12 forming a piston cylinder 12', said wall being provided at its inner end with an inturned flange 13, and said cylinder 12' being open at its inner end into the interior space 1' of casing 1, the said space constituting a surge chamber or discharge chamber for the valve. The valve means movably mounted in the aforesaid casing comprises a main valve 15 and a pilot valve 16 for controlling the operation of said main valve. The main valve 15 is formed as a valve. The main valve 15 is formed as a circular head on a tubular stem 17, said stem being provided with longitudinal ribs 18 projecting radially and slidably fitting within the port opening 11 aforesaid to support and guide the main valve. Said main valve is also supported and guided by a piston 20, slidably mounted within the cylinder 12' aforesaid, and secured to the stem 17 of the valve, said piston, for example, being screwed onto said valve stem. Said piston is preferably provided with elastic metal packing rings 21 mounted in annular grooves 22 in the piston. The valve member 15 is formed with an inclined or beveled face 25 for engaging with the inclined valve seat 10, and is formed with a cylindrical valve portion 26 to fit the port opening 11 when the valve is closed, the line of junction between said valve faces 25 and 26 being grooved as shown at 27 to insure that both of these valve faces may fit tight against their respective seats without interference by reason of grit, etc. The pilot valve 16 is formed as a beveled head or enlargement on the end of a valve stem 29 extending through the bore of the tubular valve stem 17, said stem 29 being smaller than said bore so as to permit water to flow between stem 29 and wall of said bore when the pilot valve is open, thereby enabling the water to flow from the inlet chamber 9 to the space back of the piston 20.

The cylinder 12' is closed at its outer end by a cover member 30 which may be secured to the casing 1 by screws 32 and is adapted to support suitable operating means for the pilot valve stem 29, said member 30 being hollowed out or recessed as at 12'' to receive said operating means. Said operating means may consist of an arm 35 adapted to engage the outer end of the stem 29, said arm being carried by a shaft 36 extending through a stuffing box 37 at one side of a recessed projection 38 on the cover member 30, said shaft 36 being provided with a suitable handle for example, a U shaped handle 40 secured at one end to said shaft and provided at the other end with a stud 41 engaging in a socket 42 in a boss 33 projecting from the member 30 aforesaid. A spring 45 engages with the outer end of the tubular valve stem 17, and with a collar or flange 46 on the pilot valve stem 29 so as to tend to hold the pilot valve in closed position. A drainage passage 48 is formed in the casing 1 leading from the body of the cylinder 12' to a passage 49 which communicates at its inner end with the surge chamber 1' near the outlet pipe 5. A screw 50 screws in the said passage 49, and is cut away at one side as shown at 51 so that by giving said screw a one-half turn said duct 48 may be closed or opened, as desired, and in the intermediate positions of the screws the duct 48 may be partly opened to give any desired restriction to said duct, enabling the said screw 50 to operate as a bleeding valve for the cylinder 12'. Vent duct 53 is formed on the casing leading from the cylinder 12' near the outer end thereof to the upper port of surge chamber 1', said vent duct being extremely small in diameter so that it does not interfere with the operation of the piston in the cylinder by the pressure of the water, but acts only as a gradual vent for any air trapped in the cylinder. Main valve 15 is provided with a circular head portion or rim 15' which approaches so closely to the wall 8 of inlet chamber 9 as to form a restricted passage 58 between these parts, the port opening 11, even when allowance is made for the space occupied by ribs 18, being considerably greater in area than said passage 58, namely, at least 25 per cent greater.

The operation is as follows: Normally the main valve 15 is in contact with its seat 10, and the piston 20 is at the outer end of its stroke. The pilot valve 16 is also closed against its seat, the main and pilot valves both being held in closed position by the pressure of the water in the inlet chamber, this pressure being that which exists in the supply pipe 3. When it is desired to open the valve, the handle 40 is pushed, causing the valve stem 29 to move longitudinally in the bore of tubular valve 17, and to move the pilot valve 16 away from its seat. Water then flows from the inlet chamber 9 through the passage between the valve stem 29 and said bore into the space back of the piston 20 and said piston 20 being of larger area than the valve member 15, the total pressure on the back of the piston is in excess of the pressure on the valve member 15, and the valve member 15 is therefore moved to open position by the operation of the piston, this movement of the main valve being continued until it meets the pilot valve, and if the pilot valve is fully operated the main valve will move to the full open position shown in Fig. 2. In this position the larger cylindrical portion 15' of the main valve is sufficiently close to the cylindrical wall 8 of the inlet chamber 9 to present a restricted passage 58 between said parts, which is considerably smaller than the outlet or port opening, so that by reason of this restriction between the parts 15' and 8 there is considerable obstruction to the passage of the water, and a considerable pressure is thereby maintained on the front face of the valve member 15, tending to move said valve member to closed position; this pressure being at the same time communicated, when the pilot valve is open, to the space back of the piston, so that as long as the pilot valve is open the difference of area of the piston and the main valve will serve to hold the main valve open, but as soon as the handle 40 of the pilot valve is released, the pressure of the water on the pilot valve and the operation of the spring 45 serve to move said pilot valve to closed position. As soon as the water enters the space back of the piston it begins to drain through the bleeding valve 48, and as soon as the pilot valve is closed as above described, this drainage of water from the space back of the piston relieves or reduces the pressure back of the piston, so that the pressure on the front of the main valve begins to close the same, this closing movement being limited or retarded by water back of the piston so that it can only take place as fast as such water is allowed to escape. In order to insure such closing movement of the main valve, I have found it necessary to so proportion the parts as above described that while condition of restriction or obstruction exists between the main valve member 15 and the wall of the inlet chamber so as to maintain the condition of pressure in the front of the main valve, there is substantially no restriction or obstruction at the port opening 11 or back of the main valve member 15, this fact being secured by making the effective area of the port opening 11 considerably greater than the effective area of the passage 58 between the main valve member 15 and the wall 8 of the inlet chamber. By reason of this free or unobstructed discharge of the water back of the main valve member there is no back pressure on this main valve member tending to overcome the effect of the pressure on the front thereof, whereas, if the port opening 11 were more restricted than the passage around the valve member 15, there would be a back pressure due to swirling and eddying of the water in attempting to force itself through the restricted outlet and due to reflex or rebound of the water from the restricted outlet against the back of the main valve. This effect I have found in practice is so marked in valves of this type that in practical operation it renders the valve inoperative except under especially favorable circumstances. Thus a valve with a restricted outlet may work at a certain pressure, but it will not work at a higher pressure, for the reason that the higher velocities resulting therefrom tend to produce so much back pressure on the valve that the valve is prevented from closing, particularly after the parts become a little worn, or become clogged with grit. By this provision of the free outlet opening and a restricted passage around the main valve before the water reaches the outlet opening, I am enabled to make the valve close with certainty at widely varied ranges of pressure, and moreover by reason of this construction in connection with the free discharge of the outflowing water against the piston, I am enabled to make the operation of the valve substantially uniform at all pressures for the following reasons: The restriction between the valve head and the inlet chamber wall causes all the pressure due to the restriction to act on the entire head of the valve and the back pressure on this valve head is *nil*, as hereinbefore explained. The increased pressure on the valve head and the increase of velocity of the fluid are both in the same proportion to the increase in pressure in the supply pipe, so that the valve shuts more quickly when the water flows more quickly and the quantity of fluid released under varied pressures will be therefore approximately uniform. Furthermore, the inlet chamber and the piston chamber project into the spherical chamber directly opposite each other, so that the fluid discharged from the inlet chamber is projected into the piston chamber, and striking the piston, is then reflected back around the inlet chamber into the spherical or surge chamber. This produces a reactive effect on the piston, tending to force the valve to closed position and this effect increases with the velocity of the fluid, so that the valve is closed more rapidly with a higher pressure, thereby further tending to release the same quantity of water at different pressures. The water reflected from the piston chamber in this manner into the surge chamber is reduced in velocity, allowing the discharge to be spread over an area considerably larger than the inlet valve, thereby reducing the velocity of the fluid and eliminating the noise due to the discharge. To enable the water to freely escape into the discharge or surge chamber after striking the piston, it is essential that the walls of the piston chamber and inlet chamber should be spaced apart sufficiently to permit free passage as shown in the drawing. Any sediment which may accumulate in the bottom of the piston chamber is drained off through the bleeding valve and any air that may accumulate in the upper part of the piston chamber is allowed to escape through the vent duct 53.

When the main valve is nearly closed, the cylindrical valve portion 26 enters the port 11 and closes said port, thereby bringing the full water pressure on the valve, bringing it to closed position with a positive action without the snap and hammer action which would occur if the inclined valve portion were relied on to clear the port, and also eliminates the scour on the final seating portion, namely the inclined piston, of the valve.

What I claim is:

1. A valve comprising a casing provided with an inlet chamber and with a discharge chamber and with a port between said inlet chamber and discharge chamber, said port having a valve seat, a valve member slidably mounted in said port and adapted to engage said seat, and having a valve head portion exposed to the pressure in said inlet chamber, the periphery of said valve head portion approaching the wall of said inlet chamber to form a restricted passage between said periphery and wall throughout the movement of said valve member and the port opening between said valve member and its seat being between said restricted passage and the discharge chamber and being of larger area substantially throughout the stroke of the valve than said restricted passage so that pressure due to obstruction at said restricted passage is maintained on the front of the valve member and there is substantially no pressure on the back of said valve member, said casing being further provided with a piston chamber opposite said inlet chamber, said piston chamber being open at its inner end to communicate with said discharge chamber, a piston in said piston chamber connected to said valve member, said piston being of larger area than said port opening, said valve member being operated in either direction solely by the difference in pressure on the aforesaid head portion thereof, and on said piston, said valve member having a longitudinal bore communicating at one end with the inlet chamber and at the other end with the space back of said piston, a pilot valve for closing the opening of said bore into said inlet chamber, and provided with a stem extending through said bore and manually operated means directly engaging said stem to open the pilot valve, said manually operated means being freely movable in either direction to permit the main valve to be closed solely by the pressure of the water, said casing being further provided with a drainage passage leading from the space back of the piston to the said discharge chamber.

2. A valve comprising a casing provided with an inlet chamber and with a discharge chamber and with a port between said inlet chamber and discharge chamber, said port having a valve seat, a valve member slidably mounted in said port and adapted to engage said seat, and having a valve head portion exposed to the pressure in said inlet chamber, the periphery of said valve head portion approaching the wall of said inlet chamber to form a restricted passage between said periphery and wall throughout the movement of said valve member and the port opening between said valve member and its seat being between said restricted passage and the discharge chamber and being of larger area substantially throughout the stroke of the valve than said restricted passage so that pressure due to obstruction at said restricted passage is maintained on the front of the valve member and there is substantially no pressure on the back of said valve member, said casing being further provided with a piston chamber opposite said inlet chamber, said piston chamber being open at its inner end to communicate with said discharge chamber, a piston in said piston chamber connected to said valve member, said piston being of larger area than said inlet chamber, the space between said inlet chamber and piston being unobstructed, so that water from the port may strike the piston, and the walls of the inlet chamber and piston chamber being spaced apart so that the water rebounding from the piston may freely escape into the discharge chamber, said valve member being operated in either direction solely by the difference in pressure on the aforesaid head thereof, and on said piston, said valve member having a longitudinal bore communicating at one end with the inlet chamber and at the other end with the space back of said piston, a pilot valve for closing the opening of said bore into said inlet chamber, and provided with a stem extending through said bore and manually operated means directly engaging said stem to open the pilot valve, said manually operated means being freely movable to permit the main valve to be closed solely by the pressure of the water, said casing being further provided with a drainage passage leading from the space back of the piston to the said discharge chamber.

In testimony whereof, I have hereunto set my hand at Los Angeles, California this 11th day of June, 1913.

HERMAN D. SCHROEDER.

In presence of—
ARTHUR P. KNIGHT,
MARTHA M. LANGE.